US010122285B2

United States Patent
Lu et al.

(10) Patent No.: US 10,122,285 B2
(45) Date of Patent: Nov. 6, 2018

(54) ELECTRIC POWER CONVERSION APPARATUS HAVING SINGLE-PHASE AND MULTI-PHASE OPERATION MODES

(71) Applicant: HELLA GmbH & CO. KGaA, Lippstadt (DE)

(72) Inventors: Juncheng Lu, Flint, MI (US); Hua Bai, Flint, MI (US)

(73) Assignee: HELLA GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 15/639,509

(22) Filed: Jun. 30, 2017

(65) Prior Publication Data
US 2018/0054126 A1    Feb. 22, 2018

Related U.S. Application Data

(63) Continuation of application No. 15/198,887, filed on Jun. 30, 2016, now Pat. No. 9,729,066.

(51) Int. Cl.
*H02M 1/12* (2006.01)
*H02M 3/335* (2006.01)
(Continued)

(52) U.S. Cl.
CPC ......... *H02M 3/33515* (2013.01); *H02M 1/08* (2013.01); *H02M 1/14* (2013.01);
(Continued)

(58) Field of Classification Search
CPC ............ H02M 1/08; H02M 1/42; H02M 1/15; H02M 1/14; H02M 1/4258; H02M 2001/007; Y02B 70/126
(Continued)

(56) References Cited

U.S. PATENT DOCUMENTS

| 5,311,419 A | 5/1994 | Shires |
| 5,541,808 A * | 7/1996 | Bastian ................... H02B 1/24 307/105 |

(Continued)

FOREIGN PATENT DOCUMENTS

| WO | WO2011/124223 A2 | 10/2011 |
| WO | WO2015/076776 A1 | 5/2015 |

OTHER PUBLICATIONS

Wang, et al., "Study of Energy Storage Capacitor Reduction for Single Phase PWM Rectifier", Center for Power Electronics Systems, Dept. of Electrical and Computer Engineering, Virginia Polytechnic Institute and State University, Blacksburg, VA, 24060 (2009, pp. 1177-1183).

(Continued)

*Primary Examiner* — Rajnikant Patel
(74) *Attorney, Agent, or Firm* — Warner Norcross + Judd LLP

(57) ABSTRACT

An AC/DC conversion apparatus includes first, second, and third AC/DC conversion modules operated by a controller in two modes of operation. In the first mode, the input AC signal is 3-phase and each of the three modules are enabled to handle a respective one of the input phases. In the second mode, the input AC signal is single phase and the first and second modules are enabled to deliver output power based on the single-phase AC input, while the controller actuates an H-bridge switches in the third module to which active filter circuitry is connected, to reduce an AC component in the output signal. The active filter circuitry can be selectively connected to the H-bridge switches when single-phase operation is desired, which circuitry may be disposed in a filter housing having male electrical terminals that cooperate with corresponding female terminals associated with the third module.

21 Claims, 8 Drawing Sheets

(51) Int. Cl.
*H02M 1/08* (2006.01)
*H02M 1/14* (2006.01)
*H02M 1/42* (2007.01)
*H02M 1/15* (2006.01)
*H02M 1/00* (2006.01)
*H02M 1/10* (2006.01)
*H02M 7/48* (2007.01)

(52) U.S. Cl.
CPC .............. *H02M 1/15* (2013.01); *H02M 1/42* (2013.01); *H02M 1/4258* (2013.01); *H02M 3/33584* (2013.01); *H02M 1/10* (2013.01); *H02M 1/4216* (2013.01); *H02M 1/4233* (2013.01); *H02M 7/4807* (2013.01); *H02M 2001/0009* (2013.01); *Y02B 70/126* (2013.01)

(58) Field of Classification Search
USPC ........... 363/16–17, 34–41, 64, 71, 131, 132; 323/259, 282–284
See application file for complete search history.

(56) References Cited

U.S. PATENT DOCUMENTS

| | | | | |
|---|---|---|---|---|
| 5,648,894 | A * | 7/1997 | DeDoncker | H02M 7/53873 363/39 |
| 5,668,464 | A | 9/1997 | Krein | |
| 5,982,645 | A * | 11/1999 | Levran | H01F 27/2866 307/66 |
| 6,281,660 | B1 | 8/2001 | Abe | |
| 6,794,846 | B2 * | 9/2004 | Tsuji | B60L 11/1868 320/103 |
| 6,950,322 | B2 | 9/2005 | Ferens | |
| 7,566,232 | B2 * | 7/2009 | Iida | H02J 7/0045 363/37 |
| 8,400,800 | B2 * | 3/2013 | Alexander | H02M 3/1582 363/123 |
| 8,482,947 | B2 * | 7/2013 | Chapman | H02J 3/38 363/71 |
| 9,048,756 | B2 | 6/2015 | Dong | |
| 9,093,919 | B2 | 7/2015 | Chapman | |
| 9,193,275 | B2 | 11/2015 | Guo et al. | |
| 2005/0046387 | A1 | 3/2005 | Aker et al. | |
| 2015/0155772 | A1 | 6/2015 | De Sousa | |
| 2016/0072398 | A1 * | 3/2016 | Deboy | H02M 3/33592 363/21.1 |
| 2017/0005565 | A1 | 1/2017 | Bai et al. | |

OTHER PUBLICATIONS

Juncheng Lu, Qi Tian and Hua Bai*, "An Indirect Matrix Converter Based 97%-Efficiency on-Board Level 2 Battery Charger Using E-Mode GaN HEMTs", 3rd IEEE Workshop on Wide Bandgap Power Devices and Applications, 2015, pp. 351-358.
Brusa NLG664 Battery Charger (50Hz mains version), http://www.metricmind.com/products/brusa-nlg6/, 2 pgs., (Mar. 16, 2016).
Brusa, Technical Information and Start-Up, On-Board Fast Charger NLG664-U0, www.brusa.biz, 63 pgs.
Bai et al., "Design of an 11 kw power factor correction and 10 kW ZVS DC/DC converter for a high-efficiency battery in electric vehicles," IET Power Electronics, pp. 1-9, Sep. 18, 2012.
Jauch et al., "Single-Phase Single-Stage Bidirectional Isolated ZVS AC-DC Converter with PFC," Laboratory for High Electronic Systems, ETH Zurich, Switzerland.
Jauch et al., "Modelling and ZVS Control of an Isolated Three-Phase Bidirectional AC-DC Converter," Laboratory for Power Electronic Systems, ETH Zurich.
Kasper et al., "Hyper-Efficient (98%) and Super-Compact (3.3kW/dm3) Isolated AC/DC Telecom Power Supply Module on Multi-Cell Converter Approach," Power Electronic Systems Laboratory, ETH Zurich, Switzerland, 2014.
Sattar, "Power MOSFET Basics," IXYS Corporation.
Barkhordarian, "Power MOSFET Basics," International Rectifier.
International Search Report and Written Opinion issued in PCT/IB2017/053884 (dated Sep. 15, 2017).

* cited by examiner

ELECTRIC POWER CONVERSION APPARATUS HAVING SINGLE-PHASE AND MULTI-PHASE OPERATION MODES

CROSS-REFERENCE TO RELATED APPLICATIONS

This application is a continuation of U.S. application Ser. No. 15/198,887, filed 30 Jun. 2016 (the '887 application). The '887 application is hereby incorporated by reference as though fully set forth herein.

BACKGROUND a. Technical Field

The instant disclosure relates generally to power electronics systems, and more particularly to an isolated AC/DC electric power conversion apparatus compatible with multi-phase (e.g., three-phase) and single-phase AC input power with improved power density.

b. Background

This background description is set forth below for the purpose of providing context only. Therefore, any aspects of this background description, to the extent that it does not otherwise qualify as prior art, is neither expressly nor impliedly admitted as prior art against the instant disclosure.

Isolated alternating current (AC)/direct current (DC) electric power converters can be used in many different applications. For example only, such an electric power converter can be used as a battery charger to charge a DC battery associated with an electric-motor powered automotive vehicle. Known isolated AC/DC electric power converters may adopt three main stages. For example, a typical configuration may be a half-bridge resonance based isolated AC/DC converter that includes (i) a first, converter stage configured to convert grid or mains AC voltage (e.g., 50 or 60 Hz) to an output DC voltage (to implement power factor correction) stored across a relative large capacitor, (ii) a second DC/AC converter stage configured to transform the rectified DC voltage to a relatively high-frequency AC voltage (e.g., hundreds of kHz) applied to an electrical isolation device—such as a transformer, and (iii) third AC/DC converter stage configured to rectify the high-frequency AC voltage signal to produce a final DC output voltage signal. A target battery may be arranged to receive the final DC output voltage signal. The 3-stage converter described above incorporates a relatively large, bulky DC capacitor, which can, among other things, reduce power density.

With the progress of electric vehicles, the demand for electric vehicle battery chargers is increasing. Due to different electric power grid standards in different countries, it would be desirable for such battery chargers to accommodate both three-phase AC input power (e.g., 400 VAC in Germany) as well as single-phase AC input power (e.g., 208 VAC in the United States). Such flexibility would shorten the product development period. Known dual-input power chargers (e.g., 3-phase, single-phase), however, exhibit relatively poor power density when operated with single-phase AC input power. For example, such a charger is purported to deliver ~20 kW with three-phase AC input power, but drops to only ~3.3 kW (or 6.6 KW based on the AC input) with single-phase AC input power.

It would be desirable to provide an AC/DC electric power conversion apparatus, such as battery charger, that is capable of being configured for use with either multi-phase (e.g., 3-phase) or single-phase AC input power and that exhibits improved power density when operated with single-phase AC input power.

The foregoing discussion is intended only to illustrate the present field and should not be taken as a disavowal of claim scope.

SUMMARY

In an embodiment, an apparatus is provided for converting a first AC signal to a DC signal. The apparatus includes an electronic controller including a processor and a memory and at least first, second, and third AC/DC conversion modules. Each AC/DC conversion module is connected to and is controlled by the controller. The respective output signals from the conversion modules are electrically joined at an output node. Each conversion module includes (i) an indirect matrix converter having an input interface configured to receive the first AC signal and an output interface configured to produce a second AC signal; (ii) a transformer having a primary winding and an electrically isolated and magnetically coupled secondary winding; (iii) a coupling inductor in series between the output interface of the indirect matrix converter and the primary winding; and (iv) an H-bridge switching arrangement connected to the secondary winding and configured to produce on the output node a respective output signal having a DC component and at least one AC component.

In a first mode of operation where the first AC signal comprises a multi-phase AC signal (e.g., 3-phase AC input power), the controller is configured to enable operation of the first, second, and third AC/DC conversion modules. In the first mode of operation, the AC component of the respective output signals from each AC/DC conversion module will tend to cancel each other out. In the first mode of operation, the first, second, and third AC/DC conversion modules all operate to deliver power to the output node.

In a second mode of operation where the first AC signal is a single-phase AC signal, the controller enables operation of the first and second AC/DC conversion modules and disables operation of the indirect matrix converter portion of the third AC/DC conversion module. The controller, however, actuates the H-bridge switching arrangement contained in the third AC/DC conversion module according to a filtering strategy to operate active filter circuity connected to the H-bridge, in order to reduce the AC component of the respective output signals of the first and second AC/DC conversion modules. In the second mode of operation, the first and second AC/DC conversion modules operate to deliver active power while the third AC/DC conversion module handles active filtering to reduce AC components of the output node.

Through the foregoing, improved power density for single-phase operation can be realized. This is because the first and second AC/DC conversion modules both operate while the third module is repurposed for active filtering.

In an embodiment, the controller and the first, second, and third AC/DC conversion modules are disposed in a main housing and the active filter circuitry comprises a tank circuit disposed in a filter housing. The filter housing has a first electrical coupling feature associated therewith and the main housing has a second electrical coupling feature associated therewith that is complementary with the first electrical coupling feature. These coupling features cooperate to electrically couple the active filter tank circuit to the third AC/DC conversion module. For example only, the first and second electrical coupling features may comprise male and female electrical terminals. Without the active filter inserted, the apparatus can operate based on multi-phase (e.g., 3-phase) AC input power. However, when single phase operation is desired, the filter housing can be readily plugged into the main housing to reconfigure the apparatus for use with single-phase AC input power.

The foregoing and other aspects, features, details, utilities, and advantages of the present disclosure will be apparent from reading the following description and claims, and from reviewing the accompanying drawings.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Figure 1:
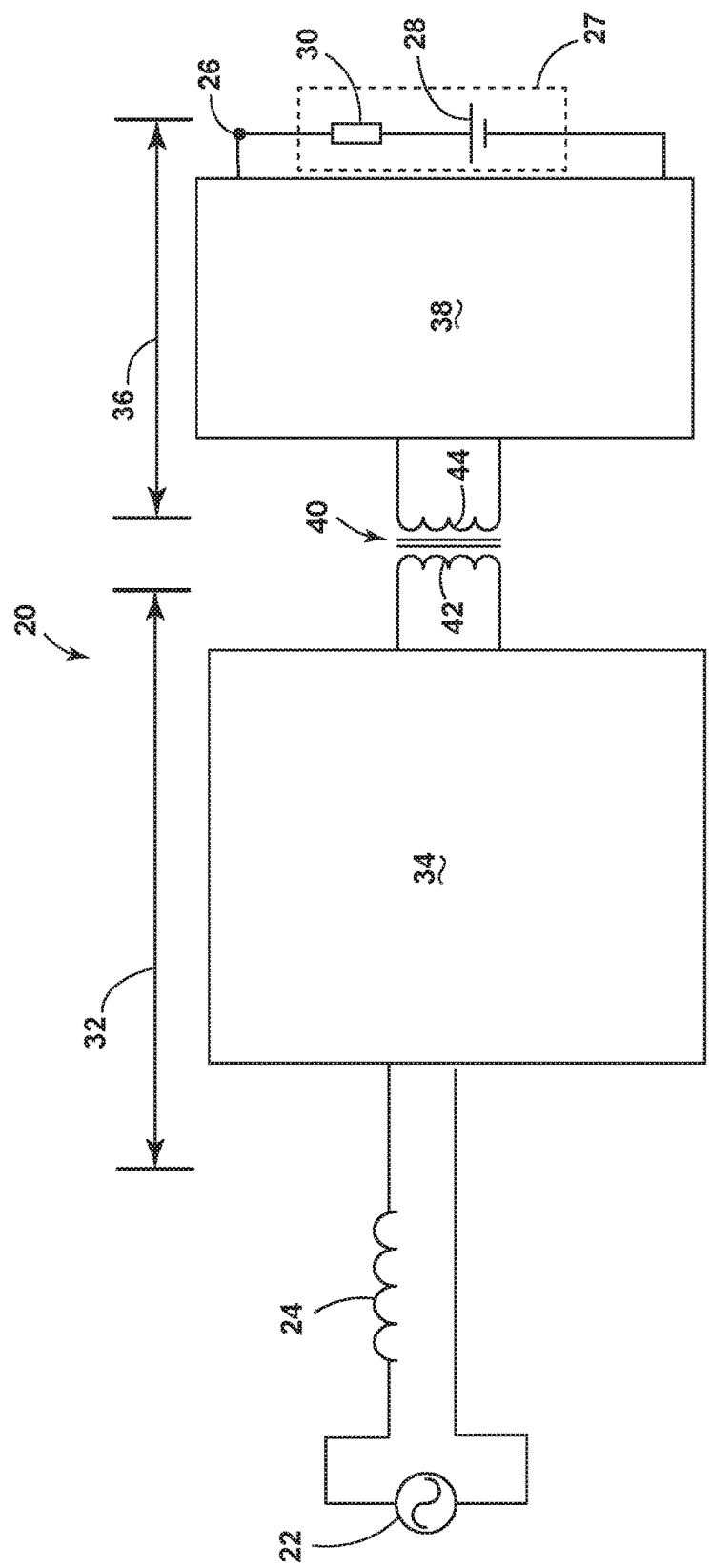
FIG. 1 is a schematic and block diagram of an isolated AC/DC electric power converter in accordance with an embodiment.

Referring now to the drawings wherein like reference numerals are used to identify identical or similar components in the various views, FIG. 1 is simplified schematic and block diagram of an isolated AC/DC electric power conversion apparatus 20 (hereinafter "conversion apparatus"). The conversion apparatus 20 of FIGS. 1-2 may form a module that can be replicated and deployed in parallel to form a multi-module conversion apparatus—described in detail in FIGS. 6-10. The modular conversion apparatus is configured to operate with both 3-phase AC input power as well as with single-phase AC input power. It exhibits improved power density when operated with single-phase AC input power as compared to conventional approaches.

As noted in the Background, conventional approaches exhibit poor power density when operated with single-phase AC input power. In this regard, while conventional 3-phase AC/DC conversion devices (e.g., chargers) could work with single phase input, they typically lack filtering for single phase operation, and thus the current ripple on the output would limit operating (output) power to a low level, resulting in poor power density with single phase power input. Implementing active filtering as a solution to the above would require additional switches and micro-controller, which would increase the cost and development period, as well as also reducing power density. The present teachings address and overcome these shortcomings.

In the illustrated embodiment, the conversion apparatus 20 is coupled to an AC input power source 22 and has an input inductor 24 configured to smooth the grid-side current. The conversion apparatus 20 is further configured to output a DC voltage signal on an output node 26, which can be used to charge a re-chargeable battery 27, such as an electric vehicle (EV) battery, for example only. The battery 27 is shown to include a battery voltage source portion 28 (sometimes referred to herein as $V_b$ or $V_{BAT}$) and a battery resistance 30 (sometimes referred to herein as $R_b$). The AC source 22 (AC power source) is configured to provide an AC input current at a specified AC input voltage level. The AC source 22 may be a main AC power supply or electrical system for a building or the like provided within an overall larger AC electric power grid (hereinafter sometimes referred to as grid power, grid voltage, grid-side, etc.). The AC source 22 may be single-phase or multi-phase (e.g., 3-phase). Depending on location, the AC source 22 may output 120 volts or 240 volts at 60 Hz, 110 volts or 220 volts at 50 Hz, or 380-480 volts at 50 Hz (3-phase power). The voltage $V_b$ of re-chargeable battery 27 may be nominally between about 200-500 VDC. In an embodiment, the conversion apparatus 20 may have an output voltage of about 360 V.

The conversion apparatus 20 includes two main stages, wherein a first stage 32 comprises an AC/AC converter 34 and a second stage 36 comprises an AC/DC rectifier 38. The stages are electrically isolated but coupled by way of a transformer 40 having a primary winding 42 and a secondary winding 44.

The first stage 32 may comprise an indirect matrix converter (MC) as the AC/AC converter 34, and may comprise conventional approaches for constructing the same as known in the art. It should be understood, however, that converter 34 may comprise a true matrix converter. The indirect matrix converter type AC/AC converter 34 has minimal energy storage requirements, which eliminates the need for bulky and lifetime-limited energy-storing capacitors, and exhibits improved efficiency, for example, by merging three-stages as known in the art (see Background) down to two-stages, and as seen by reference to U.S. patent application Ser. No. 14/789,412, filed 1 Jul. 2016, (hereinafter the '412 application, entitled "ELECTRIC POWER CONVERSION APPARATUS"), which '412 application is hereby incorporated by reference as though fully set forth herein. Eliminating the DC-bus capacitor can also increase the power density of the overall apparatus.

Figure 2:
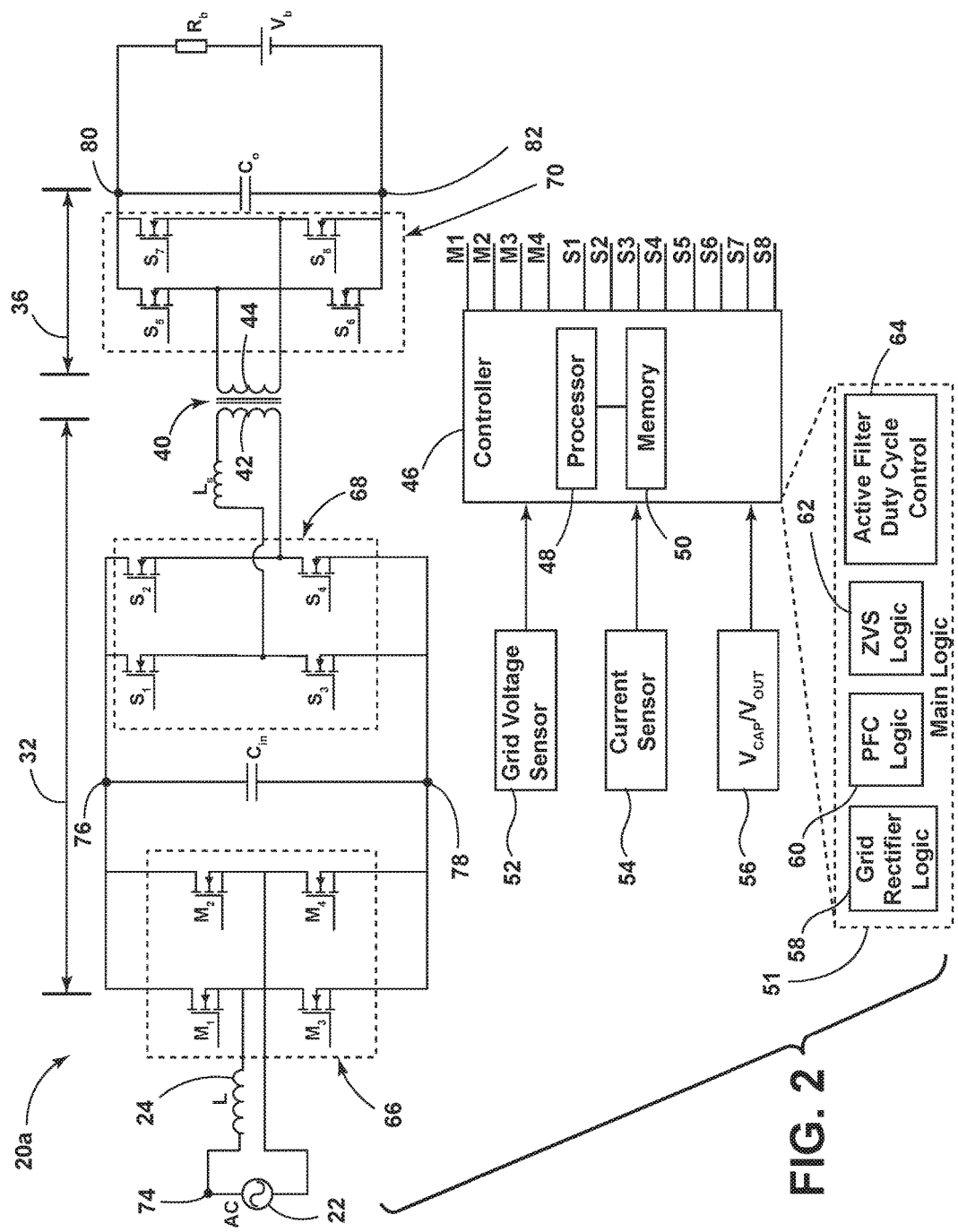
FIG. 2 is diagrammatic schematic and block diagram of an isolated AC/DC electric power converter according to another embodiment.

FIG. 2 shows an electric power conversion apparatus, designated 20a, that features an indirect matrix converter. Conversion apparatus 20a includes two main stages, namely, a first stage 32 that includes an AC/AC converter in the form of an indirect matrix converter and a second stage 36 that includes an AC/DC rectifier part 36.

On the input (grid) side, FIG. 2 shows AC (grid) source 22, which may be a single-phase, 60 Hz, 120 volt alternating current (AC) voltage signal or alternately a single-phase 50 Hz AC signal, or a multi-phase (e.g., 3-phase) alternating current (AC) source. On the output (battery) side, FIG. 2 shows a rechargeable battery $V_b$ with battery resistance $R_b$.

The first stage 32 includes an input inductor 24 (sometime referred to as "L"), an indirect matrix converter, a coupling inductor $L_s$, and transformer 40, which includes primary windings 42 and secondary windings 44.

The input inductor 24 is electrically coupled in series with AC source 22 and is configured to smooth the grid-side current in respect of AC source 22. The size of inductor 24 will depend on the degree of smoothing and the switching frequency. In an embodiment, inductor 24 may be about 10 micro-henry (μH).

In an embodiment, the indirect matrix converter includes a full bridge rectifier 66 (AC/DC converter), a filter capacitor designated $C_{in}$, and a DC/AC full bridge converter 68. The indirect matrix converter is configured for AC/AC conversion and further includes an input interface configured to receive a first AC signal from AC source 22 and an output interface configured to produce a second AC signal. As shown in FIG. 2, the input interface of the indirect matrix converter is coupled to both sides of the AC source 22 through inductor 24. The output interface of the indirect matrix converter is coupled to both ends of the primary winding 42 through the coupling inductor $L_s$.

Full bridge rectifier 66 constitutes a means for rectifying the first alternating current (AC) input signal at node 74 (i.e., which presents at a first, grid frequency, for example, 60 Hz) and producing a first rectified output signal at node 76. The first rectified signal includes a first direct current (DC) component. Rectifier 66 may include four semiconductor switches, designated $M_1$, $M_2$, $M_3$, $M_4$, arranged in a full bridge configuration and operating at the grid frequency. The switches $M_1$, $M_2$, $M_3$, $M_4$ may comprise conventional semiconductor switches known in the art, such as MOSFET or IGBT devices. In an embodiment, the switches $M_1$, $M_2$, $M_3$, $M_4$ may comprise an N-Channel power MOSFET provided under the trade designation and/or part number STY139N65M5 from STMicroelectronics, Coppell, Tex., USA.

Capacitor $C_{in}$ is connected across the output of rectifier 66, between node 76 and a ground node 78. Capacitor $C_{in}$ is configured in size to filter high-frequency harmonics from the rectified signal at node 76 (e.g., relatively small: ~uF level). It should be understood that $C_{in}$ is not used for energy storage, but is rather used for filtering purposes, and is thus not a large, bulky DC-bus capacitor as is typical for conventional 3-stage converters where the DC-bus capacitor may be on the order of millifarads (~mF). This reduced size in $C_{in}$ can increase the power density and extend the service life of the conversion apparatus 20a.

The DC/AC converter 68 is electrically connected to the output of rectifier 66 (i.e., connected across nodes 76, 78). The DC/AC converter 68 is configured to convert the first DC (rectified) signal on node 76 into a second AC signal. As illustrated, DC/AC converter 68 may comprise four semiconductor switches, designated $S_1$, $S_2$, $S_3$, $S_4$, and arranged in a full bridge configuration operating at a second frequency, namely, a switching frequency $f_s$. The second, switching frequency $f_s$ is generally much higher than the first, grid frequency. In an embodiment, the second, switching frequency may be in a range of between about 135 kHz to 500 kHz, while the first, grid frequency may be 60 Hz (or 50 Hz). The semiconductor switches $S_1$, $S_2$, $S_3$, $S_4$ may comprise commercially available components known in the art.

Inductor $L_s$ is electrically connected in series between the DC/AC converter 68 and primary winding 42.

Transformer 40 constitutes an electrical isolation device and includes a primary winding 42 and an electrically isolated and magnetically coupled secondary winding 44. As known, transformer 40 is characterized by a turn ratio between the secondary winding and the primary winding.

The second stage 36 of conversion apparatus 20a includes an AC/DC converter 70 and an output capacitor designated $C_o$.

AC/DC converter 70 is electrically connected to the second winding 44 of transformer 40 and is configured to convert or rectify the AC signal induced on the secondary winding 44 to a second rectified output signal on output node 80. The output signal produced on the output node 80 from the single phase conversion device 20a has a DC component and at least one AC component, wherein the at least one AC component includes a second order harmonic of the grid frequency (e.g., a 120 Hz components for a 60 Hz grid frequency).

In the illustrated embodiment, the AC/DC converter 70 may comprise four semiconductor switches, designated switches $S_5$, $S_6$, $S_7$, $S_8$, arranged in an active H-bridge (full) switching arrangement 70. In an embodiment, H-bridge switching arrangement 70 is controlled to operate at the above-mentioned switching frequency $f_s$ (i.e., switches $S_1$~$S_8$ are controlled to operate at the same switching frequency $f_s$). The semiconductor switches $S_5$, $S_6$, $S_7$, $S_8$, may comprise commercially available components, for example, a GaN High Electron Mobility Transistor (HEMT) device, such as an enhancement mode GaN transistor provided under the trade designation and/or part number GS66516T from GaN Systems Corp., Ann Arbor, Mich., USA.

Output capacitor $C_o$ is connected across the output of H-bridge 70 between output node 80 and an output ground node 82 and is configured in size to filter high-frequency harmonics from the output signal at node 80 (e.g., relatively small: ~uF level). In an embodiment, capacitor $C_o$ may be about 100 μF.

Conversion apparatus 20a further includes an electronic control unit 46 (hereinafter controller 46) configured to implement a desired control strategy for the operation of conversion apparatus 20a. Controller 46 includes a processor 48 and a memory 50. Processor 48 may include processing capabilities as well as an input/output (I/O) interface through which processor 48 may receive a plurality of input signals and generate a plurality of output signals (e.g., gate drive signals for switches $M_1$~$M_4$ and $S_1$~$S_8$). Memory 50 is provided for storage of data and instructions or code (i.e., software) for processor 48. Memory 50 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although not shown in FIG. 2, conversion apparatus 20a may also include a driver circuit to interface between the outputs of controller 46 and the gate terminals of the semiconductor switches. In an embodiment, such gate drive devices may comprise commercially available components, such as a commercially available chip known in the art, for example, a gate drive chip available under part number IXD_614 from IXYS Corporation, Milpitas, Calif., USA.

Memory 50 stores executable code in the form of main control logic 51, which is configured to control the operation of conversion apparatus 20a in accordance with a desired control strategy. Main control logic 51, when executed by processor 48, is configured to generate, in response to one or more input signals, the various gate drive signals for the switches $M_1$~$M_4$ and $S_1$~$S_8$. Main control logic 51 may include programmed logic blocks to implement specific functions, including without limitation rectifier logic 58, power factor correction (PFC) logic 60, zero voltage switching (ZVS) logic 62, and active filter duty cycle control logic 64. The active filter duty cycle control logic 64 will be described in greater detail below in a multi-phase, modular electric power conversion apparatus embodiment.

The grid rectifier logic 58 is configured to generate the gate drive signals for switches $M_1$~$M_4$ of rectifier 66. To accomplish this, conversion apparatus 20a may include a grid voltage sensor 52 (shown in block form) configured to output a signal indicative of a grid voltage, including a polarity (i.e., positive or negative). The voltage sensor 52 may be disposed on the grid side (i.e., electrically connected to AC source 22) to monitor the grid voltage. In an embodiment, grid voltage sensor 52 may comprise conventional components known in the art.

Figure 3:
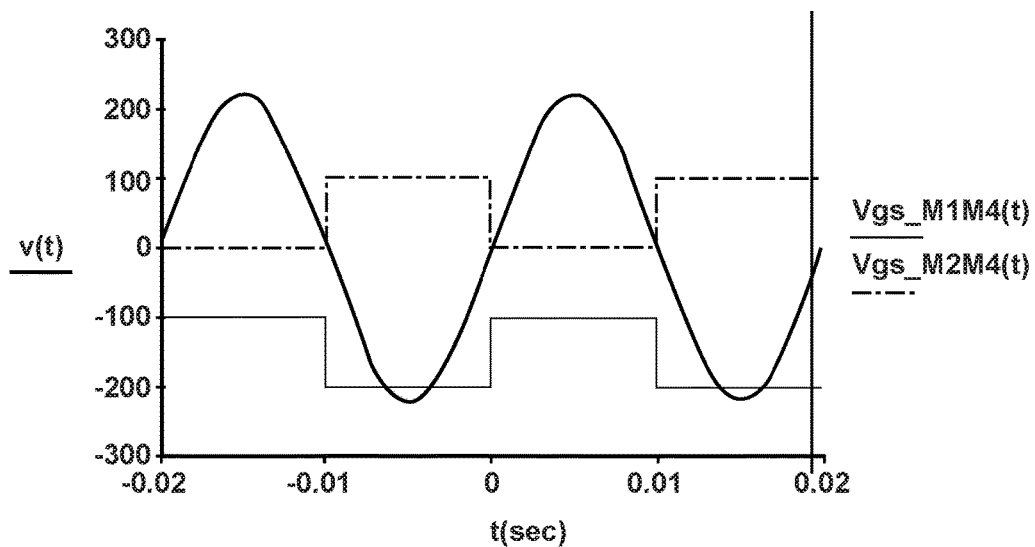
FIG. 3 shows simplified, timing diagrams of a first set of switch control signals associated with a full bridge based AC/DC rectifier of FIG. 2.

FIG. 3 shows timing diagrams of the gate drive signals (i.e., switch control signals) produced by the grid rectifier logic 58 of controller 46. The $M_1$~$M_4$ based H-bridge rectifier 66 will rectify the grid AC voltage into a DC voltage. The switching frequency of $M_1$~$M_4$ is the same as the grid voltage (e.g., 50~60 Hz). Note, that $M_1$~$M_4$ are controlled by the detecting the polarity of the grid voltage. Thus, when the grid voltage is positive, $M_1$ and $M_4$ are turned on (i.e., the $V_{GS}$ of $M_1$ and $M_4$ is high). When the grid voltage is negative, $M_2$ and $M_3$ are turned on. The gate drive signals for switches $M_1$ and $M_4$ operate in unison while switches $M_2$ and $M_3$ operate in unison. Additionally, the combination of $M_1M_4$ are complementary to the combination of $M_2M_3$. In sum, the switches $M_1$~$M_4$ are all active switches working at the grid frequency, e.g., 60 Hz, as per the zero transitions of the grid voltage sensor 52 output.

Referring again to FIG. 2, power factor correction (PFC) control logic 60 is configured, in general, to manage the operation (i.e., conduction or non-conduction) of the switches $S_1$~$S_8$ in such a way so as to control the instantaneous current from AC source 22 so as to be in phase with the instantaneous voltage of the AC source 22. To achieve a unity or near unity power factor (i.e., a condition where the grid side voltage and current are in phase), conversion apparatus 20a includes a grid current sensor 54. In an embodiment, the current sensor 54 is configured to determine the current through inductor 24, and provide a signal to controller 46 that indicates the level of electrical current being drawn from AC source 22. This signal is thus a grid current indicative signal. In an embodiment, controller 46 through PFC logic 60 implements power factor correction by controlling the gate drive signals for switches $S_1$~$S_8$. This will be described in greater detail below. Grid current sensor 54 may comprise conventional components known in the art.

Zero voltage switching (ZVS) logic 62 is configured, in general, to manage the switches $S_1$~$S_8$ in such a way so that they are turned on and off preferably with a zero or a near zero voltage. Generally, in order to maintain zero voltage switching for switch turn-on, before the turning on action, current should reverse flow from the source to drain, which makes the switch voltage drop to zero. Thus, during the switch turn on, the switch only undertakes the current change with a voltage then-prevailing across the drain to source of the switch always being close to be zero, which in turn eliminates the turn-on loss to thereby reach the ZVS turn on. For more information, reference may be made to U.S. application Ser. No. 14/744,998, filed 19 Jun. 2015 (hereinafter the '998 application, entitled "GATE DRIVE CIRCUIT"), which '998 application is hereby incorporated by reference as though fully set forth herein.

Figure 4:
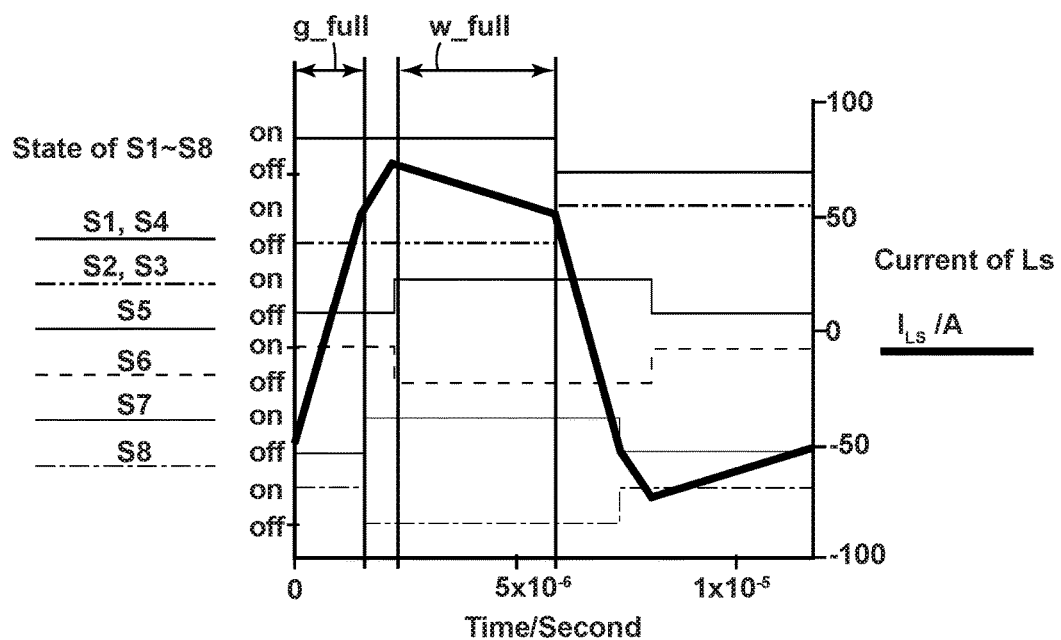
FIG. 4 shows simplified, timing diagrams of a second set of switch control signals to control the operation of the grid-side DC/AC converter and the battery-side AC/DC rectifier (H-bridge) of FIG. 2.

FIG. 4 shows timing diagrams of the gate drive signals (i.e., a second set of switch control signals) to control the operation of switches $S_1$~$S_8$, in a single switching frequency embodiment. In the illustrated embodiment, $S_1$~$S_8$ will be operated at the same switching frequency $f_s$ with 50% duty cycle. To achieve the high system power density, the switching frequency $f_s$ should be as high as possible. The gate drive signals for $S_1$ and $S_2$, $S_3$ and $S_4$, $S_5$ and $S_6$, and $S_7$ and $S_8$, are complementary. The main control logic 51 is configured to introduce a phase shift between the gate drive signals for $S_5$ and $S_7$. Plural factors, including the switching frequency $f_s$ and the determined phase shift between $S_5$ and $S_7$, together determine the power transferred from the primary side of transformer 40 to the secondary side. In other words, the above-mentioned factors provide two (2) degrees of freedom to control the transferred power. Meanwhile, in order to achieve ZVS, the $S_5$-to-$S_7$ phase shift must fall into a certain range, which restricts the switching frequency $f_s$ to a certain value as well. In FIG. 4, the current through inductor $L_s$ is also shown, in timed relationship to the states of switches $S_1$~$S_8$.

Figure 5:
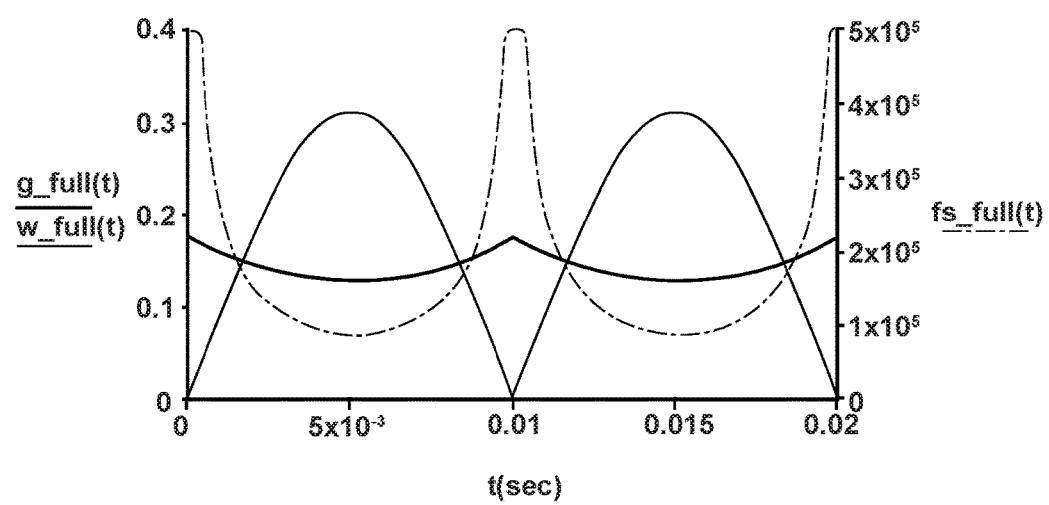
FIG. 5 is a timing diagram of parameters for determining switch timing in FIG. 4.

The main control logic 51, in compliance with PFC logic 60 and ZVS logic 62, determine at least two parameters, designated g_full and w_full in FIGS. 4-5. The g_full parameter corresponds to a time delay between $S_2$ and $S_8$ falling edges, while the w_full parameter corresponds to a time delay between $S_1$ and $S_6$ falling edges. The $S_5$-to-$S_7$ phase shift is defined in between g_full and w_full, as graphically shown in FIG. 4.

FIG. 5 is a timing diagram showing waveforms of the above-described g_full and w_full parameters, which are the two parameters used by controller 46 to determine the phase shift between S$_5$ and S$_7$. The parameter fs_full corresponds to the switching frequency f$_s$.

In an embodiment, the main control logic 51 is executed by controller 46 wherein the functions of rectifier logic 58, PFC logic 60, and ZVS logic 62 are realized concurrently. In this regard, the w_full parameter may be determined by controller 46 in accordance with eqn. (1):

$$w\_full(t) := \frac{0.5 \cdot (|v(t)| - 2 \cdot g\_full(t) \cdot |v(t)|)}{V2 \cdot n\_full} \quad \text{Equation (1)}$$

where V(t) is measured voltage on the grid side of converter 20a (i.e., input node 74—FIG. 2), V2 is the measured output voltage of the converter at node 80, and n_full is turn ratio of the transformer 40 (i.e., N$_s$/N$_p$ where N$_s$ is the number of secondary turns and N$_p$ is the number of primary turns). The parameter g_full in Equation (1) is determined by system designer to achieve ZVS switching. In an embodiment, g_full=0.5(gmin+gmax), where the functions of gmin and gmax are as set forth in Equations (2) and (3) below:

$$gmin\_full(t) := \frac{2Is\_full \cdot Lf \cdot fsa}{|v(t)| + V2 \cdot n\_full} \quad \text{Equation (2)}$$

$$gmax\_full(t) := \frac{V2^2 \cdot n\_full^2 - V2 \cdot n\_full \cdot |v(t)| + 2 \cdot (|v(t)|)^2}{4 \cdot V2^2 \cdot n\_full^2 + 4 \cdot (|v(t)|)^2} \quad \text{Equation (3)}$$

where gmin is determined by the minimum reactive energy to achieve zero voltage switching (ZVS) and Is_full is the minimum current to achieve ZVS, Lf is the series inductance on primary side (this is represented as L$_s$ in FIG. 2), and fsa is the system maximum switching frequency. The variables V(t) and V2 is defined above.

In addition, the parameter gmax is determined by the monotonous zone of controlled variable (instantaneous transferred power vs. g_full).

In operation, controller 46 varies the switching frequency f$_s$ in real time during operation. In other words, controller 46 executing main control logic 51 (and subordinate logic modules noted above) varies the operating switching frequency of S1~S8 during real time operation. First, the switching frequency of switches S1~S8 (i.e., fs_full or sometimes referred to as f$_s$ herein) and the parameter g_full together determine the instantaneous power. In addition, the parameter g_full is defined by g_full=0.5(gmin+gmax) as noted above. Thus, the switching frequency fs_full is determined by the instantaneous power and g_full, as in Equation (4) below:

$$fs\_full(t) := \left[ 2 \cdot |v(t)| \cdot \right. \quad \text{Equation (4)}$$

$$\frac{(1 - 2 \cdot w\_full(t)) \cdot |v(t)| + 2 \cdot V2 \cdot n\_full \cdot g\_full(t)}{4 \cdot Lf \cdot Ptrans\_full(t)} \cdot$$

$$\left. (0.5 - g\_full(t)), fsa \right]$$

In addition, it should be understood that the ZVS implementation may restrict switching frequency. In this regard, the g_full and fs_full parameters together determine transferred power. The g_full parameter is determined by ZVS, and the switching frequency is determined by the required transferred power and the g_full parameter (or ZVS). Additionally, power factor correction (PFC) requires that the transferred power from the primary side to the secondary side of the transformer to be in-phase with the input AC voltage, which is determined together by the g_full and the fs_full parameters as described above.

Modular AC/DC Conversion Apparatus.

It is desirable to provide an AC/DC electric power conversion apparatus such as an EV battery charger that is or can be made compatible with both multi-phase (e.g., 3-phase) and single-phase AC input power. However, conventional attempts have resulted in devices that have poor power density when operated with single-phase AC input power. In accordance with the present teachings, a modular approach is taken that improves the power density of such devices when operated with single-phase AC input power.

The modular electric power conversion apparatus operates in two modes and, in an embodiment, includes three AC/DC conversion modules. The first mode (FIG. 6) addresses the case where the AC input power signal is a 3-phase input power signal, and in this mode the controller will enable operation of all three AC/DC conversion modules. The individual phases of the 2-phase input are offset from each other, as known, as thus the AC component of the respective output signals of the three AC/DC conversion modules, being also offset in phase, will tend to cancel each other out. The second mode addresses the case where the AC input power signal is a single-phase input power signal, and in this mode the controller will enable operation of two of the three AC/DC conversion modules to produce charging power. The controller, however, will only enable aspects of the remaining, third AC/DC conversion module for purposes of active filtering so as to reduce the AC component (e.g., $2^{nd}$ order harmonic) that would otherwise remain present in the output signal produced by the first and second AC/DC conversion modules. Repurposing the switches present in the third AC/DC conversion module when operating in the second mode for active filtering purposes eliminates the need for additional switches, micro-controller, and other filtering components.

Figure 6:
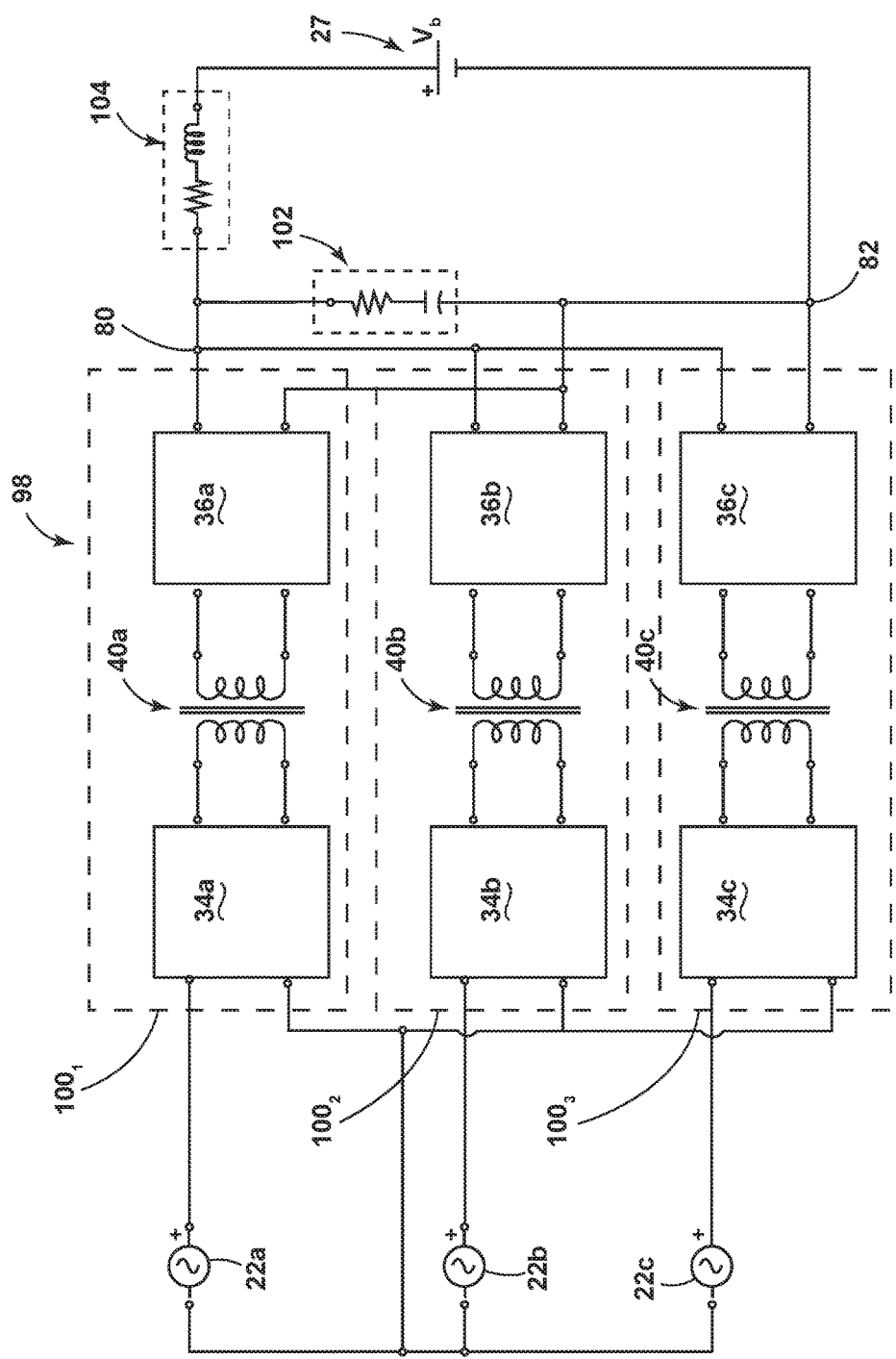
FIG. 6 is a simplified schematic and block diagram of a modular AC/DC electric power conversion apparatus showing first, second, and third AC/DC conversion modules for operating with 3-phase AC input power, in an embodiment.

Referring now to FIG. 6, a schematic and block diagram is illustrated of a modular AC/DC electric power conversion apparatus 98. The apparatus 98 is configured to convert a first AC signal (e.g., a 3-phase AC input power signal) to a DC output signal on output node 80. The above-described topology (FIG. 2) for a single-phase AC power source 22 (i.e., conversion apparatus 20a) can be replicated and applied in a parallel fashion. Apparatus 98 is an embodiment of an application of this approach for use with three-phase AC input power. In the illustrated embodiment, no additional output filtering is needed because the output current of conversion module handling a respective phase has a natural 120° difference with respect to each of the other phases, and accordingly when added together, all the AC components as combined will tend to cancel each other out (i.e., an undesirable ripple can be neutralized).

With continued reference to FIG. 6, a three-phase AC source is shown, for example, as individual sources 22a, 22b, 22c providing AC input power having a respective phase (designated phase a, phase b, and phase c). Each source 22a, 22b, 22c produces a respective AC signal whose phase is offset, for example, by 120 degrees, as is conventional. The AC/AC converter 34 (e.g., indirect matrix converter), the AC/DC rectifier 36 (e.g., H-bridge switching arrangement), and the transformer 40 shown in FIGS. 1 and 2—along with other components shown in FIGS. 1 and 2—can be replicated for each individual source to form first, second, and third AC/DC conversion modules $100_1$, $100_2$, and $100_3$, respectively. Each of the AC/DC conversion modules $100_1$, $100_2$, and $100_3$ handle a respective single phase of the multi-phase (3-phase) AC input power. The output of each of the AC/DC conversion modules $100_1$, $100_2$, and $100_3$ are electrically connected at output node 80. FIG. 6 further shows (i) an output capacitance (and associated series resistance) represented as block 102 that is coupled between output node 80 and a ground node 82, and (ii) an output inductor (and associated series resistance) represented as block 104 coupled between output node 80 and battery 27. The battery 27, which has a battery voltage $V_b$, is also shown for frame of reference.

Although not shown in FIG. 6, the controller 46 shown and described in connection with FIG. 2 will also be provided in this embodiment. Each of the AC/DC conversion modules $100_1$, $100_2$, and $100_3$ will be electrically connected and controlled by the controller 47. In the configuration of FIG. 6 for handling 3-phase input power, the controller 46 is configured to enable operation of all three of the AC/DC conversion modules $100_1$, $100_2$, and $100_3$. Each conversion module $100_1$, $100_2$, and $100_3$ may be operated by controller 47 in substantially the same manner as described above in connection with a single electric conversion apparatus 20a of FIG. 2. In an embodiment, each module $100_1$, $100_2$, and $100_3$ may deliver about 7.2 kW, which results in an overall output power (e.g., charging power) >20 kW. Moreover, in the first mode, the AC components (e.g., $2^{nd}$ order harmonic) produced by each AC/DC conversion module will tend to cancel each other out, due to the phase offsets described above.

Figure 7:
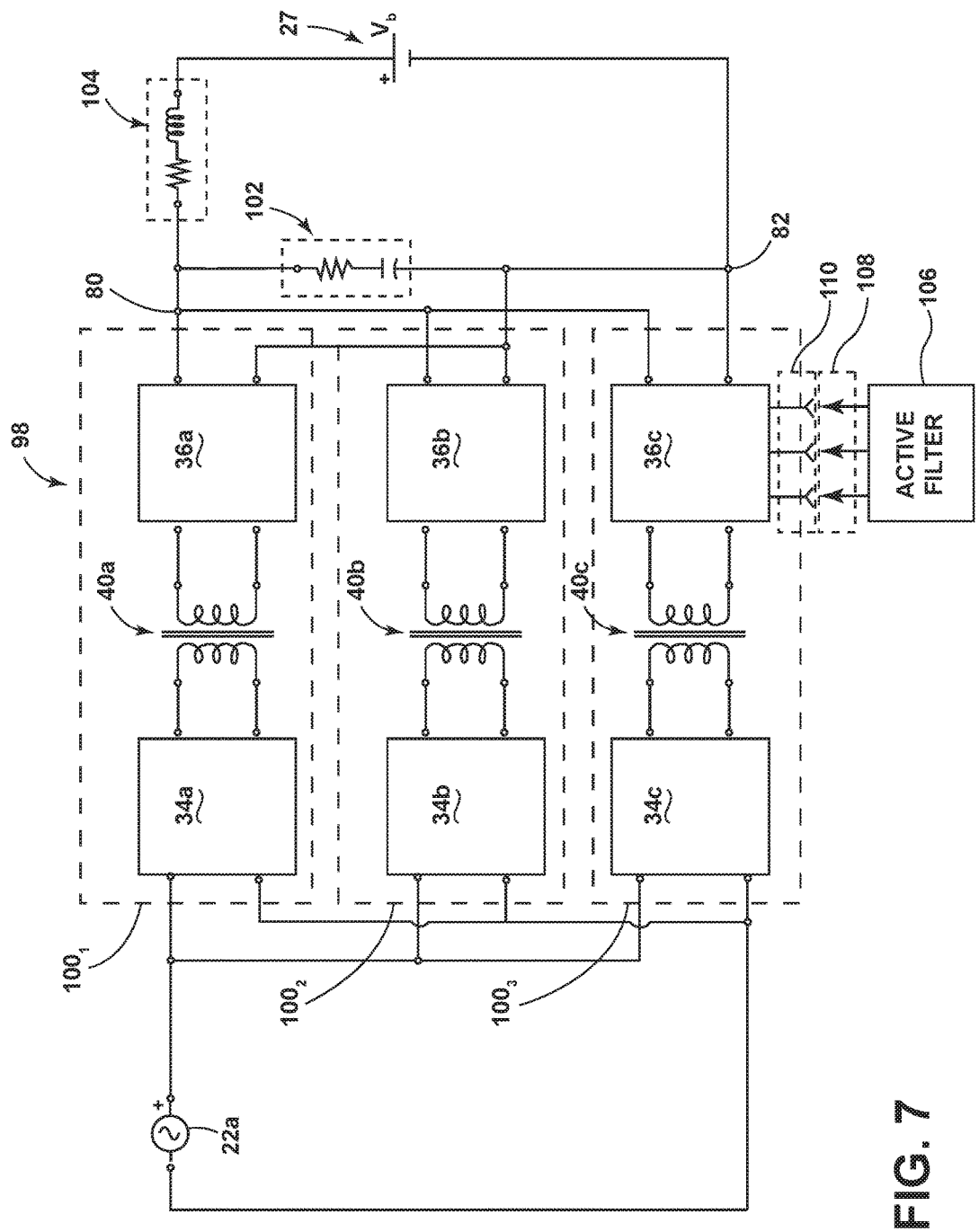
FIG. 7 is a simplified schematic and block diagram of a modular AC/DC electric power conversion apparatus showing first, second, and third AC/DC conversion modules and active filter circuitry, for operating with single-phase AC input power, in an embodiment.

FIG. 7 is a schematic and block diagram of apparatus 98, which is the same as shown in FIG. 6, except that it is configured for use with single-phase AC input power. A single-phase AC input power source 22a is distributed to each of the AC/DC conversion modules $100_1$, $100_2$, and $100_3$. It should be appreciated, however, than when operating with single-phase AC input power, a significant second harmonic of the grid frequency (e.g., 120 Hz in the case of a 60 Hz grid frequency) will appear on the output and will not tend to be cancelled out by the presence of similar—but offset—harmonics from the other phases. The presence of the second harmonic is undesirable for many applications, including charging applications for many current electric vehicle (EV) battery types.

Figure 9:
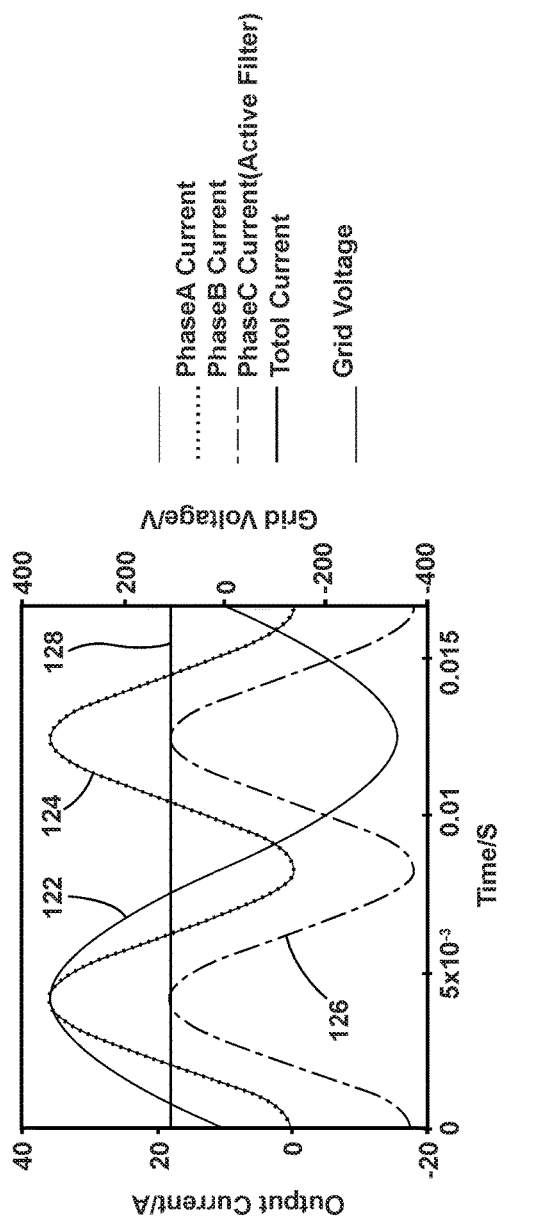
FIGS. 9-10 are simplified, timing diagrams showing phase currents and voltage on an output node during operation of the embodiment of FIG. 7.

For example, as shown in FIG. 9, a 60 Hz single-phase AC input power signal 122 (grid power) produces—in the absence of filtering—a relatively large 120 Hz AC component on the output signal (trace 124). In accordance with the present teachings, one of the already-available AC/DC conversion modules is reconfigured for use in active filtering the output.

For single phase operation, the apparatus 98 may be selectively configured to include active filter circuitry 106, shown in block form in FIG. 7. The apparatus may include (i) a filter housing (not shown) in which the active filter circuitry 106 is disposed and (ii) a main housing (not shown) in which at least the first, second, and third AC/DC conversion modules $100_1$, $100_2$, and $100_3$ and controller 46 are disposed. The filter housing includes a first electrical coupling feature 108 and the main housing includes a second electrical coupling feature 110 that is complementary with the first coupling feature 108. The first coupling feature 108 is configured to cooperate with the second coupling feature 110 to electrically couple the active filter circuitry 106 with the third AC/DC conversion module $100_3$. In an embodiment, the first electrical coupling feature 108 may comprise one of either male or female electrical terminals while the second electrical coupling feature 110 may comprises the other one of the male or female electrical terminals.

In one embodiment, the first coupling feature 108 may include a plurality of male terminals on the filter housing while the second coupling feature 110 may include a corresponding plurality of female terminals in the main housing. It should be understood, however, that the above-mentioned first and second coupling features 108, 110 need not appear at the filter housing or main housing, but rather at other locations known in the art. For example, such coupling features may appear at or on respective circuit board locations.

Additionally, it should be appreciated that the first and second electrical coupling features 108, 110 may also perform a mechanical coupling function to securely, mechanically couple the active filter circuitry 106 with or to the apparatus 98 (or portions thereof). In a still further embodiment, the first and second coupling features 108, 110 may be configured to allow the active filter circuitry 106 to be selectively insertable and removable (e.g., insertable or removable by hand by a user without the need for tools, electrical soldering, etc.). This aspect allows the apparatus to be readily configured for operation with single-phase AC input power from a multi-phase (3-phase) input power configuration (or vice-versa).

Figure 8:
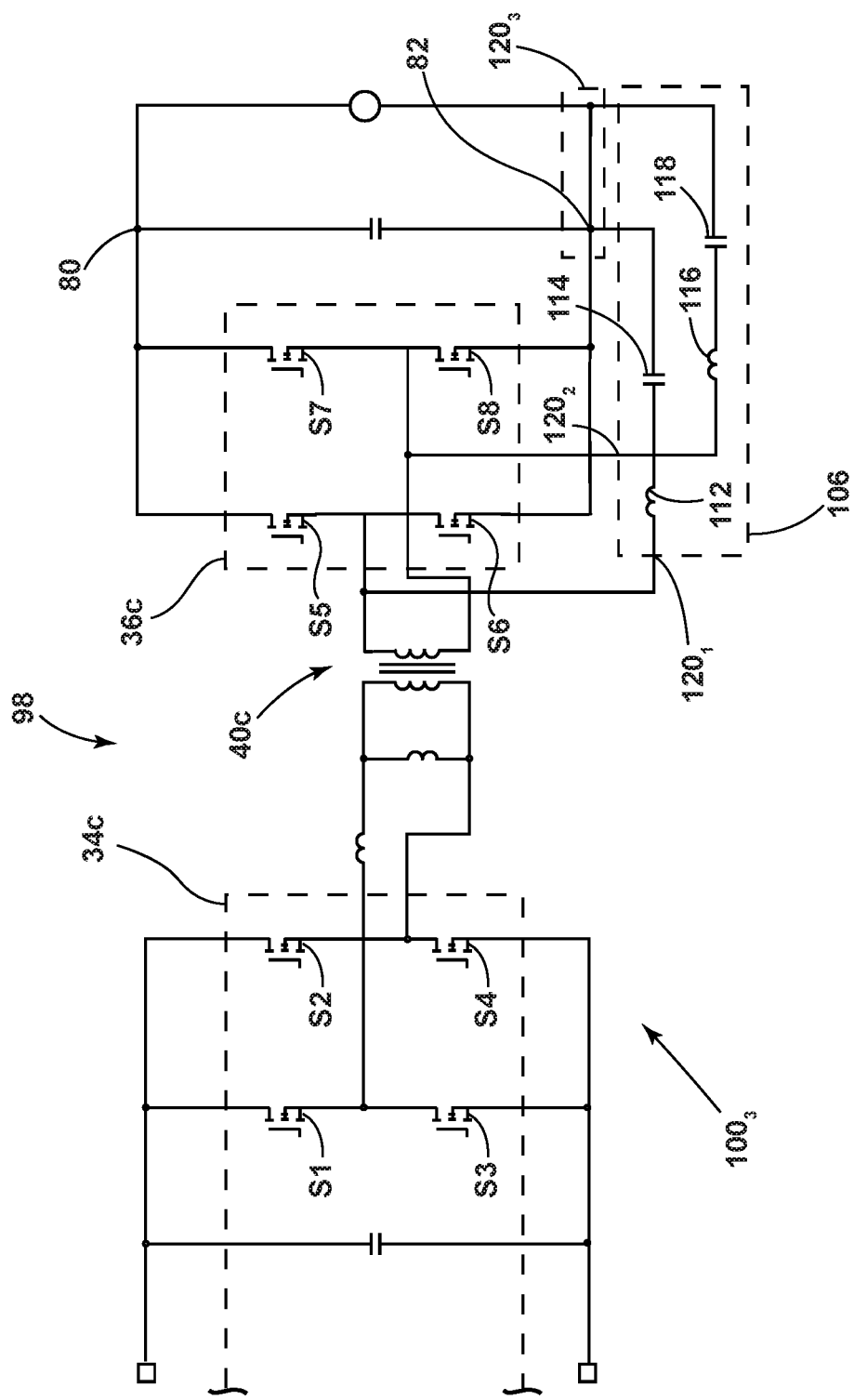
FIG. 8 is a simplified schematic and block diagram of the third AC/DC conversion module of FIG. 7, showing active filter circuitry in greater detail.

FIG. 8 shows in greater detail the apparatus 98 as configured for single phase operation. As described above, in the second mode of operation, the controller 46 enables operation of the first and second AC/DC conversion modules $100_1$, $100_2$ but only enables a portion of the third AC/DC conversion module $100_3$. In this regard, the controller enables operation of the H-bridge switching arrangement 36c, to which active filter circuitry 106 is connected. However, the controller 46 disables the AC/AC converter 34c, partially shown in FIG. 8, such that the switches M1-M4 and S1-S4 are turned OFF.

The active filter circuitry 106 comprises an LC tank circuit having (i) a first branch with a first inductor 112 and a series-connected first capacitor 114, and (ii) a second branch with a second inductor 116 and a series-connected second capacitor 118. When the active filter circuitry 106 is plugged into the apparatus 98, the two parallel LC tank circuits (branches) are electrically connected between the H-bridge switching arrangement 36c and the output ground node 82.

In an embodiment, the filter housing of the active filter circuitry 106 comprises three male terminal, designated $120_1$, $120_2$, and $120_3$, which cooperate with corresponding female terminals, as described above. One end of the first branch LC tank circuit (inductor 112, capacitor 114) is connected via terminal $120_1$ to an electrical node in between switches S5 and S6, while the other end of the first branch is connected via terminal $120_3$ to output ground node 82. In addition, one end of the second branch LC tank circuit (inductor 116, capacitor 118) is connected via terminal $120_2$ to an electrical node in between switches S7 and S8, while the other end of the second branch is also connected via terminal $120_3$ to output ground node 82. In the illustrated embodiment, the two parallel branches disposed on the secondary side of the transformer 40c form the active filter. In an alternate embodiment, based on the instantaneous power output of the system, and thus needs of the system, one of the branches may be omitted or the controller 46 may be configured to disable or otherwise disengage one of the branches.

In an embodiment, the inductance and capacitance values selected may be L=10 uH (for inductor 116) and C=500 uF (for capacitor 118). The inductance value L for inductor 116 may be selected using conventional approaches known in the art. For the value for the capacitance C for capacitor 118, the value C should be selected sufficiently large to effectively choke a substantial portion of the reactive power in the system/output. In an embodiment where the apparatus comprises a battery charger, and for purposes of example only, assume that ω is the line frequency, the charger average output voltage is $V_B$, and that the charging current is $I=I_{ave}+I_p \sin(2\omega t)$. Here $I_{ave}$ is the average charging current, $I_p$ is the peak current of the 120 Hz ripple component in the output. Therefore, the instantaneous power may be expressed as:

$$P = V_B I_{ave} + V_B I_p \sin(2\omega t).$$

The active filter, comprising inductor 116 and capacitor 118, may be configured so as to be sufficiently capable to handle the reactive power component: $V_B I_p \sin(2\omega t)$. In the worse-case scenario, when C is small enough, the capacitor voltage is between $V_B$ and 0. Namely, $$\frac{1}{2}C(V_B^2 - 0) > \frac{V_B I_p}{2\pi f}.$$

$$\text{Therefore, } C > \frac{I_p}{\pi f V_B}.$$

Figure 10:
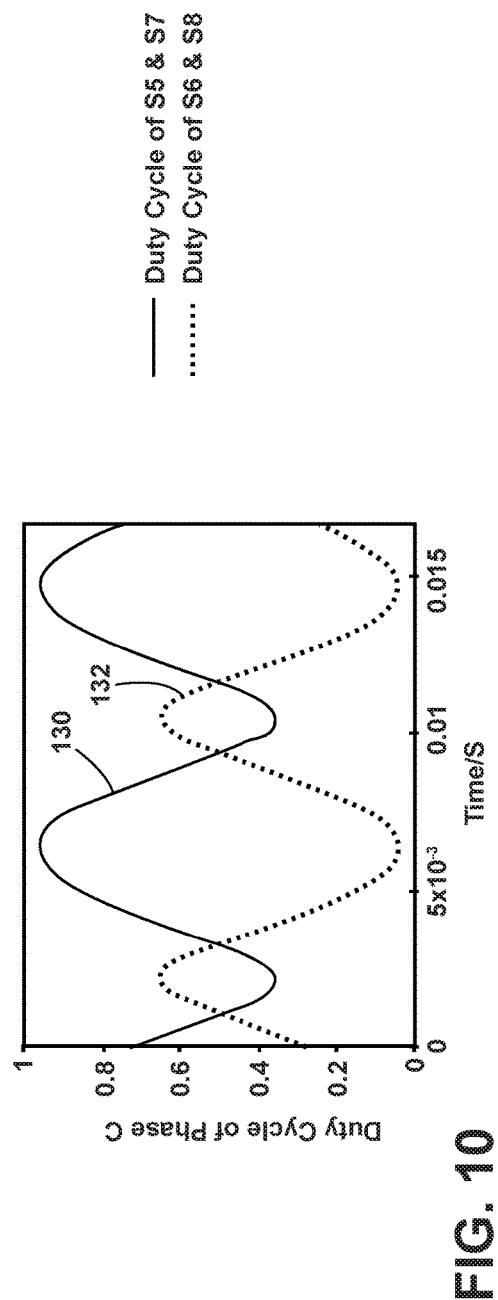

Referring to FIGS. 9-10, the controller 46, in the second mode of operation, is configured to actuate switches S5-S8 of the H-bridge switching arrangement 36c in accordance with a filtering strategy, which engages the active filter circuitry 106 to reduce an AC component present in the output signal (e.g., $2^{nd}$ order harmonics). As shown in FIG. 9, the trace 124 corresponding to the output current of the AC/DC conversion modules 120₁, 120₂ (denoted PHASEA/PHASEB in the legend of FIG. 9) shows a significant $2^{nd}$ order harmonic of the grid frequency. The controller 46 actuates switches S5-S8 such that S5 and S7 are controlled together and likewise S6 and S8 are controlled together, in such a manner that the active filter current 126 neutralizes the AC component shown in trace 124. This reduction in the $2^{nd}$ order harmonic in the output signal is shown as trace 128.

FIG. 10 shows an exemplary duty cycle in accordance with which the controller 46 actuates the switch pairs S5, S7 (trace 130) and S6, S8 (trace 132). As illustrated, typically the larger the gap between the instantaneous power and the average power, the larger the duty cycle of the switch pairs S5,S7 or S6,S8. However, it should be understood that due to the existence of the filter inductor (inductor 116), there may be a phase delay between the duty-cycle waveform and the output current.

To execute this methodology on the above-described structure, the controller 46 is configured to perform an initial step of determining whether the AC input signal is a multi-phase (e.g., 3-phase) signal or whether the AC input signal is single phase. The controller 46 can make this determination by detecting the grid voltage by way of grid voltage sensor 52.

If the controller 46 determines that the AC input power is multi-phase (e.g., 3-phase), then the main control logic 51 branches to the a step which involves operation of the apparatus 98 in the first mode of operation. The controller 46 then controls the AC/DC conversion modules 100₁, 100₂, and 100₃ as described above for the first mode of operation.

If the controller 46 determines, alternatively, that the AC input power is single-phase, then the main control logic 51 branches to another step which involves operation of the apparatus 98 in the second mode of operation. The controller 46 then controls the AC/DC conversion modules 100₁, 100₂, and 100₃ as described above for the second mode. In this regard, the controller 46 is further configured to execute the active filter duty cycle control logic 64 (FIG. 2). The logic 64, when executed by the controller 64 (i.e., the processor thereof), the controller 46 controls the AC/DC conversion modules 100₁, 100₂, and 100₃ in the manner described above. It should be appreciated that the main control logic 51 associated with a single phase, namely, the control logic controlling the operation of the third AC/DC conversion module, needs to be changed when apparatus switches modes from the first mode to the second mode. In addition, only the active filter circuitry 106 needs to be plugged in (as described above) to complete the conversion from 3-phase to single phase operation. The foregoing aspects can shorten a product development period.

Conventional AC/DC electric conversion devices capable of handling both 3-phase and single-phase AC input power have poor power density when operated with single-phase AC input power.

According to the present teachings, an apparatus for converting an AC input signal to a DC output signal operates in two modes and thereby improves the power density when operating with single-phase AC input power, compared to conventional devices. Embodiments consistent with the present teachings may have a power density of ~5 kW/L. Thus, as noted above, in the first mode, each AC/DC conversion module separately delivers about 7.2 kW, which results in an overall power (e.g., charging power) of >20 kW, while in the second mode, the two active first and second modules together deliver 7.2 kW*2, or about 14.4 kW as the active output power, while the third AC/DC conversion module (i.e., secondary-side switches) handle the reactive power through operating the active filter tank. The single phase operation can deliver approximately ⅔ of the rated power (i.e., rated power as when operating from 3-phase power), or about 14.4 kW. This significantly increases the power density of the apparatus when running in single phase mode (i.e., much greater than conventional 3.3 kW/L).

It should be understood that an electronic control unit as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic control unit may further be of the type having both ROM, RAM, a combination of non-volatile and volatile (modifiable) memory so that any software may be stored and yet allow storage and processing of dynamically produced data and/or signals.

Although only certain embodiments have been described above with a certain degree of particularity, those skilled in the art could make numerous alterations to the disclosed embodiments without departing from the scope of this disclosure. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. In a power conversion system having a main housing in which are disposed a first, a second, and a third single-phase AC/DC conversion module each connected to and controlled by an electronic controller, wherein each AC/DC conversion module includes a respective indirect matrix converter having a respective AC output coupled to a respective H-bridge switching arrangement configured to produce a respective output signal having a DC component and at least one AC component, and wherein the respective output signals are electrically joined at an output node, and wherein the power conversion system has associated therewith an electrical coupling feature, a filter apparatus comprising:
    a filter housing in which an active filter circuit is disposed wherein said active filter circuit is configured to reduce said AC component of said output signals, wherein said electrical coupling feature associated with the power conversion system is a first electrical coupling feature, said active filter circuit having associated therewith a second electrical coupling feature that is complementary with respect to said first electrical coupling feature, and wherein said first and second electrical coupling features cooperate to electrically couple said active filter circuit to said third AC/DC conversion module and a ground node of the power conversion system.

2. The filter apparatus of claim 1 wherein each indirect matrix converter has a respective input interface configured to receive a first AC signal.

3. The filter apparatus of claim 2 wherein said electronic controller is configured to operate said AC/DC conversion modules (i) in a first mode of operation where said first AC signal comprises a multi-phase AC signal, said controller being configured to enable operation of said first, second, and third AC/DC conversion modules wherein respective AC components of said respective output signals tend to cancel each other out; and (ii) in a second mode of operation where said first AC signal comprises a single-phase AC signal, said controller enabling operation of said first and second AC/DC conversion modules and disabling operation of said indirect matrix converter of said third AC/DC conversion module, said controller being further configured to actuate said H-bridge switching arrangement of said third AC/DC conversion module having said active filter circuit coupled thereto according to a filtering strategy to reduce said at least one AC component of said output signals of said first and said second AC/DC conversion modules.

4. The filter apparatus of claim 3 wherein said active filter circuit is selectively removable to electrically uncouple said active filter circuit.

5. The filter apparatus of claim 4 wherein said active filter circuit comprises an inductor-capacitor (LC) tank circuit.

6. The filter apparatus of claim 1 wherein said first electrical coupling feature is one of male and female electrical terminals and said second electrical coupling feature is the other one of said male and female electrical terminals.

7. The filter apparatus 6 wherein said first electrical coupling feature comprises female electrical terminals and said second electrical coupling feature comprises male electrical terminals.

8. The filter apparatus of claim 7 wherein said main housing includes said first electrical coupling feature comprising female electrical terminals.

9. The filter apparatus of claim 7 wherein said filter housing includes said second electrical coupling feature comprising male electrical terminals.

10. The filter apparatus of claim 7 wherein a circuit board associated with the power conversion system includes said first electrical coupling feature comprising female electrical terminals.

11. The filter apparatus of claim 7 wherein a circuit board associated with said active filter circuit includes said second electrical coupling feature comprising male electrical terminals.

12. The filter apparatus of claim 1 wherein said first electrical coupling feature and said second electrical coupling feature are configured to perform a mechanical coupling function.

13. The filter apparatus of claim 1 wherein said first electrical coupling feature and said second electrical coupling feature are configured to be selectively insertable and removable by a user without the need for tools.

14. The filter apparatus of claim 5 wherein said LC tank circuit includes (i) a first branch with a first inductor and a series-connected first capacitor and (ii) a second branch with a second inductor and a series-connected second capacitor.

15. The filter apparatus of claim 14 wherein said first branch and said second branch are electrically connected to said H-bridge switching arrangement of said third AC/DC conversion module and said ground node.

16. The filter apparatus of claim 15 wherein said first electrical coupling feature comprises three female electrical terminals and said second electrical coupling feature comprises three male electrical terminals, wherein one end of said first branch is electrically coupled to a first one of said male electrical terminals, and wherein one end of said second branch is electrically coupled to a second one of said male electrical terminals, and wherein the other end of said first branch and said second branch are both electrically coupled to a third one of said male electrical terminals.

17. The filter apparatus of claim 16 wherein said third one of said male electrical terminals is configured to be electrically coupled to said ground node.

18. The filter apparatus of claim 14 wherein said first branch and said second branch are in an electrical parallel relationship.

19. The filter apparatus of claim 14 wherein said electronic controller is configured to disable one of said first branch and said second branch.

20. The filter apparatus of claim 1 wherein said first and second coupling features electrically couple said active filter circuit to said H-bridge switching arrangement of said third AC/DC conversion module and said ground node of the power conversion system.

21. An apparatus for converting a first AC signal to a DC signal, comprising:
- an electronic controller including a processor and a memory; and
- first, second, and third single-phase AC/DC conversion module each connected to and controlled by said controller, and wherein respective output signals from said conversion modules are electrically joined at an output node, each conversion module comprising:
  (i) an indirect matrix converter having an input interface configured to receive said first AC signal and an output interface configured to produce a second AC signal; (ii) a transformer having a primary winding and an electrically isolated and magnetically coupled secondary winding; (iii) a coupling inductor in series between said output interface of said indirect matrix converter and said primary winding; and (iv) an H-bridge switching arrangement connected to said secondary winding and configured to produce on said output node a respective output signal having a DC component and at least one AC component;

wherein in a first mode of operation where said first AC signal comprises a multi-phase AC signal, said controller is configured to enable operation of said first, second, and third AC/DC conversion modules wherein respective AC components of said respective output signals tend to cancel each other out; and wherein in a second mode of operation where said first AC signal comprises a single-phase AC signal, said controller enables operation of said first and second AC/DC conversion modules and disables operation of said indirect matrix converter of said third AC/DC conversion module, said controller being configured to operate said third AC/DC conversion module having an active filter coupled thereto according to a filtering strategy to reduce said AC component of said output signals of said first and second AC/DC conversion modules.

* * * * *